(12) United States Patent
Tanaka et al.

(10) Patent No.: US 9,297,260 B2
(45) Date of Patent: Mar. 29, 2016

(54) AIRFLOW CONTROL DEVICE AND AIRFLOW CONTROL METHOD

(75) Inventors: Motofumi Tanaka, Yokohama (JP); Hisashi Matsuda, Tokyo (JP); Hiroyuki Yasui, Yokohama (JP); Shohei Goshima, Yokohama (JP); Naohiko Shimura, Atsugi (JP); Kunihiko Wada, Yokohama (JP); Tamon Ozaki, Fuchu (JP); Toshiki Osako, Kawasaki (JP); Masahiro Asayama, Yokohama (JP); Yutaka Uchida, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 869 days.

(21) Appl. No.: 13/419,211

(22) Filed: Mar. 13, 2012

(65) Prior Publication Data

US 2012/0291874 A1 Nov. 22, 2012

(30) Foreign Application Priority Data

May 16, 2011 (JP) ................. P2011-109474

(51) Int. Cl.
| | |
|---|---|
| *F17D 1/16* | (2006.01) |
| *F17D 1/18* | (2006.01) |
| *F15C 1/04* | (2006.01) |

(Continued)

(52) U.S. Cl.
CPC .......... *F01D 5/145* (2013.01); *F05D 2240/127* (2013.01); *F05D 2270/17* (2013.01); *F05D 2270/172* (2013.01); *Y10T 137/0391* (2015.04); *Y10T 137/2185* (2015.04); *Y10T 137/2191* (2015.04); *Y10T 137/2224* (2015.04)

(58) Field of Classification Search
CPC ................. F01D 5/145; F05D 2270/17; F05D 2240/127; F05D 2270/172; Y10T 137/2224; Y10T 137/2191; Y10T 137/0391; Y10T 137/2185

USPC ................. 137/13, 826, 827, 833; 244/199.1, 244/199.2, 199.3, 205
See application file for complete search history.

(56) References Cited

U.S. PATENT DOCUMENTS

| | | |
|---|---|---|
| 5,133,519 A | 7/1992 | Falco |
| 5,334,012 A | 8/1994 | Brock et al. |

FOREIGN PATENT DOCUMENTS

| | | |
|---|---|---|
| DE | 10 2004 038 930 A1 | 2/2006 |
| JP | 2000-055014 A | 2/2000 |

(Continued)

OTHER PUBLICATIONS

Matsuda et al.; "Experimental Study on Flow Control Using Non-Thermal Plasma (Pulsed Modulation Control Effect on Separation Flow)", The Japan Society of Mechanical Engineers Publication B Version, vol. 74, No. 744, pp. 1667-1672, (2008).

(Continued)

*Primary Examiner* — John K Fristoe, Jr.
*Assistant Examiner* — Kelsey Rohman
(74) *Attorney, Agent, or Firm* — Finnegan, Henderson, Farabow, Garrett & Dunner, L.L.P.

(57) ABSTRACT

An airflow control device 10 in an embodiment includes: a vortex shedding structure portion 20 discharging an airflow flowing on a surface in a flow direction as a vortex flow; and a first electrode 40 and a second electrode 41 disposed on a downstream side of the vortex shedding structure portion 20 via a dielectric. By applying a voltage between the first electrode 40 and the second electrode 41, flow of the airflow on the downstream side of the vortex shedding structure portion 20 is controlled.

17 Claims, 12 Drawing Sheets

(51) Int. Cl.
  *F15C 1/06* (2006.01)
  *B64C 21/00* (2006.01)
  *B64C 23/00* (2006.01)
  *B64C 23/06* (2006.01)
  *F01D 5/14* (2006.01)

(56) References Cited

FOREIGN PATENT DOCUMENTS

| JP | 2007-317656 | | 12/2007 |
| JP | 2008-25434 | | 2/2008 |
| JP | 2010-014265 A | | 1/2010 |
| JP | 2010119946 A | * | 6/2010 |
| WO | WO 2008136697 A1 | * | 11/2008 |

OTHER PUBLICATIONS

Official Action issued by the Japanese Patent Office on Nov. 4, 2015, for Japanese Patent Application No. 2015-018541, and English-language translation thereof.

Official Action issued by the Japanese Patent Office on Dec. 2, 2014, for Japanese Patent Application No. 2011-109474, and English-language translation thereof.

Terumi Sudo et al., Control of Backward-Facing step Flow by Plasma Actuator, The Japan Society of Mechanical Engineers, pp. 67-68 (2010).

* cited by examiner

AIRFLOW CONTROL DEVICE AND AIRFLOW CONTROL METHOD

CROSS-REFERENCE TO RELATED APPLICATION

This application is based upon and claims the benefit of priority from Japanese Patent Application No. 2011-109474, filed on May 16, 2011; the entire contents of which are incorporated herein by reference.

FIELD

Embodiments described herein relate generally to an airflow control device and an airflow control method.

BACKGROUND

In a fluid apparatus or the like, it is important to achieve an efficiency improvement of the fluid apparatus and decreases in vibration and noise by controlling flow of fluid flowing inside the fluid apparatus.

As a flow control means, there has been developed a technique of plasmatizing part of fluid to generate a plasma induced flow. According to this airflow generation device, it is possible to generate a thin laminar flow on a flat plate, and to vary velocity distribution of a boundary layer of the flow. For this reason, by forcibly changing the flow from a laminar flow to a turbulent flow, and generating/eliminating a vortex flow, it is possible to control the flow of the fluid flowing inside the fluid apparatus and improve aerodynamic characteristics and the like of the fluid apparatus.

Further, the above-described airflow generation device is provided on two-dimensionally symmetrical blades, and pulse modulation control of intermittently increasing/decreasing or turning on/off a voltage to be applied to the airflow generation device is performed, and thereby efficient airflow control is made possible. Particularly, it is found that when a frequency of pulse modulation is set to a frequency in the vicinity of a dominant frequency of flow velocity variation detected in a blade wake flow, an effect of which a large-scale separation flow is drawn to the blade surface appears.

The above-described dominant frequency changes according to the size or structure of an apparatus, the relative velocity of fluid to an object, the viscosity of fluid, or the like. For this reason, it is difficult to estimate the dominant frequency except for the limited case such as a Karman vortex street of a cylinder wake flow. Thus, in the case of a dynamic flow of which a flow velocity or an inlet angle changes, installation of a fluid variation sensor for determining the frequency of the pulse modulation control is required, which causes an increase in manufacturing cost of the device.

DETAILED DESCRIPTION

In one embodiment, an airflow control device includes: a vortex shedding structure portion discharging an airflow flowing on a surface in a flow direction as a vortex flow; and a pair of electrodes disposed on a downstream side of the vortex shedding structure portion via a dielectric. Then, by applying a voltage between the pair of electrodes, flow of the airflow on the downstream side of the vortex shedding structure portion is controlled.

Hereinafter, embodiments of the present invention will be explained with reference to the drawings.

First Embodiment

Figure 1:
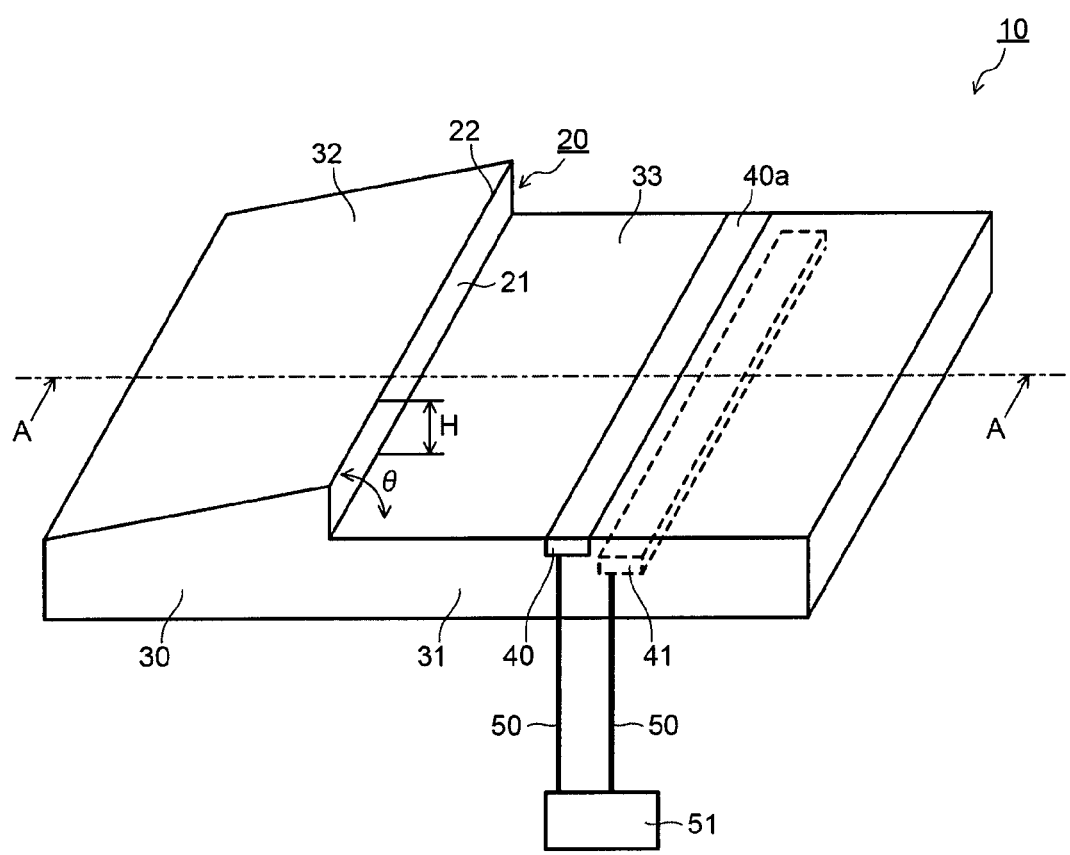
FIG. 1 is a perspective view of an airflow control device in a first embodiment.
Figure 2:
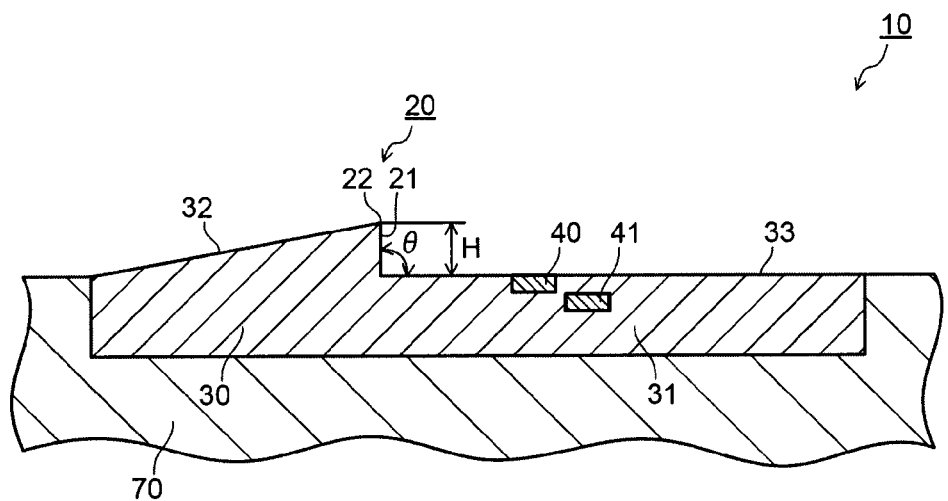
FIG. 2 is a view illustrating a cross-section taken along A-A in FIG. 1 in the airflow control device in the first embodiment.

FIG. 1 is a perspective view of an airflow control device 10 in a first embodiment. FIG. 2 is a view illustrating a cross-section taken along A-A in FIG. 1 in the airflow control device 10 in the first embodiment. Incidentally, in the following embodiments, the same reference numerals and symbols are given to the same components, and redundant explanation will be omitted or simplified.

The airflow control device 10 in the first embodiment includes a vortex shedding structure portion 20 intermittently discharging an airflow flowing on a surface in a flow direction as a vortex flow. The above vortex shedding structure portion 20, as illustrated in FIG. 1 and FIG. 2, is formed of a stepped portion 21 formed at the boundary between an upstream side structure portion 30 having the airflow flow on a surface 32 and extended in the flow direction of the airflow and a downstream side structure portion 31 whose surface 33 is recessed in a stepped manner from the surface 32 of the upstream side structure portion 30 to be extended in the flow direction of the airflow. Further, the airflow control device 10 includes a first electrode 40 and a second electrode 41 being a pair of electrodes on a downstream side of the vortex shedding structure portion 20.

The upstream side structure portion 30 includes the surface 32 (an inclined surface) projecting toward the airflow side as it goes in the flow direction of the airflow. The airflow flows to the downstream side (the downstream side structure portion 31 side) along the above surface 32 being the inclined surface.

The downstream side structure portion 31 is formed so that the surface 33 is recessed in a stepped manner from the surface 32 of the upstream side structure portion 30 to be extended in the flow direction of the airflow. That is, the surface 33 of the downstream side structure portion 31 is extended in the flow direction of the airflow from an end portion of the stepped portion 21.

As above, the stepped portion 21 is formed at the boundary between the upstream side structure portion 30 and the downstream side structure portion 31. The boundary between the stepped portion 21 and the upstream side structure portion 30, namely an intersecting edge portion 22 where the upstream side structure portion 30 and the stepped portion 21 intersect is formed of a corner portion.

Here, there is described one example where the stepped portion 21 is formed so that an angle θ formed by a surface of the stepped portion 21 and the surface 33 of the downstream side structure portion 31 becomes approximately 90 degrees, but the stepped portion 21 is not limited to the above structure. The stepped portion 21 may also be formed so that the angle θ formed by the surface of the stepped portion 21 and the surface 33 of the downstream side structure portion 31 falls within a range of 30 to 90 degrees, for example.

In the vortex shedding structure portion 20, when the airflow having flowed through on the surface of the upstream side structure portion 30 passes through the intersecting edge portion 22, a vortex having an axis in a direction parallel to the intersecting edge portion 22 (a transverse vortex) is intermittently discharged in the flow direction as a vortex flow. A discharge frequency at which the above vortex flow is discharged is distributed with peaks at a dominant frequency fs centrally. The above dominant frequency fs can be expressed by a function of a height H of the stepped portion 21 of the vortex shedding structure portion 20 and a main flow velocity U of the airflow flowing on a surface of the airflow control device 10 by Expression (1) expressed as follows.

$$fs = A \times U/H \qquad \text{Expression (1)}$$

Here, A is a constant. The height H of the stepped portion 21 of the vortex shedding structure portion 20 is the length of a perpendicular line dropped from the intersecting edge portion 22 to the surface 33, or to the same plane surface as the surface 33.

The height H of the stepped portion 21 is preferably set to 0.1% or less, and more preferably set to 0.01% or less or so of the representative length of a fluid phenomenon to which the airflow control device 10 is applied (the chord length in the case of leading edge separation of a blade). Alternatively, the height H of the stepped portion 21 is preferably set to not less than 5 μm nor more than 500 μm in the actual measurement within a range of Reynolds number being $1 \times 10^4$ to $1 \times 10^7$, or set to 10×U/ν or less (in which U denotes the main flow velocity and ν denotes a dynamic viscosity).

The reason why these ranges are preferable is because in the case of the function of the airflow control device 10 being unnecessary, it is necessary to make the step to the degree that the structure of the airflow control device 10 does not cause fluid resistance. Thus, the height H of the stepped portion 21 is required to be set to equal to or less than the thickness of a viscous sublayer of a turbulent boundary layer controlling frictional resistance.

The first electrode 40 and the second electrode 41 are disposed in the downstream side structure portion 31. The first electrode 40 is disposed in the downstream side structure portion 31 so that one surface 40a thereof is in plane with the surface 33 of the downstream side structure portion 31. Incidentally, the first electrode 40 may also be buried in the downstream side structure portion 31 so that the surface 40a is not exposed.

The second electrode 41 is buried in the downstream side structure portion 31 to be displaced and separated in the flow direction of the airflow from the first electrode 40. The second electrode 41 is buried deeper than the first electrode 40 from the surface 33 of the downstream side structure portion 31.

The first electrode 40 and the second electrode 41 are connected to a discharge power supply 51 that applies a voltage between the first electrode 40 and the second electrode 41 via a cable 50.

The discharge power supply 51 can apply an alternating voltage between the first electrode 40 and the second electrode 41. Further, the discharge power supply 51 may also include a pulse modulation function that applies a voltage between the first electrode 40 and the second electrode 41 in a manner to increase/decrease or turn on/off the voltage intermittently at a cycle different from that of the alternating voltage.

A frequency of the alternating voltage or a pulse modulation frequency to be applied by the discharge power supply 51 is preferably set to a frequency close to the dominant frequency fs of the vortex flow discharged intermittently from the vortex shedding structure portion 20. Concretely, these frequencies are preferably controlled to be ±10% of the dominant frequency fs. The reason why the above range is preferable is because, as will be described later, if these frequencies are within the above range, it is possible to make a discharge phenomenon of the vortex flow resonate efficiently by the discharge energy to strength the vortex flow.

Here, the structure in which the first electrode 40 and the second electrode 41 are directly provided in the downstream side structure portion 31 is described. Thus, the downstream side structure portion 31 is formed of a dielectric material. The dielectric material is not limited in particular, and the downstream side structure portion 31 is formed of a well-known solid dielectric material. For example, an inorganic insulating material such as alumina, glass, or mica, an organic insulating material such as polyimide, glass epoxy, or rubber, and the like, which are electrical insulating materials, are cited, and the optimum dielectric material is selected as usage to be used.

Here, one example where the upstream side structure portion 30 and the downstream side structure portion 31 are formed integrally is described, so that the upstream side structure portion 30 is also formed of the same material as that of the downstream side structure portion 31. Note that the upstream side structure portion 30 and the downstream side structure port ion 31 may also be formed separately. In the above case, the upstream side structure portion 30 is not required to be formed of a dielectric material, and can be formed of a material different from the downstream side structure portion 31. The upstream side structure portion 30 and the downstream side structure portion 31 that are formed separately are joined by providing a joint structure in both joint portions, or bonded by an adhesive material or the like, for example.

Figure 3:
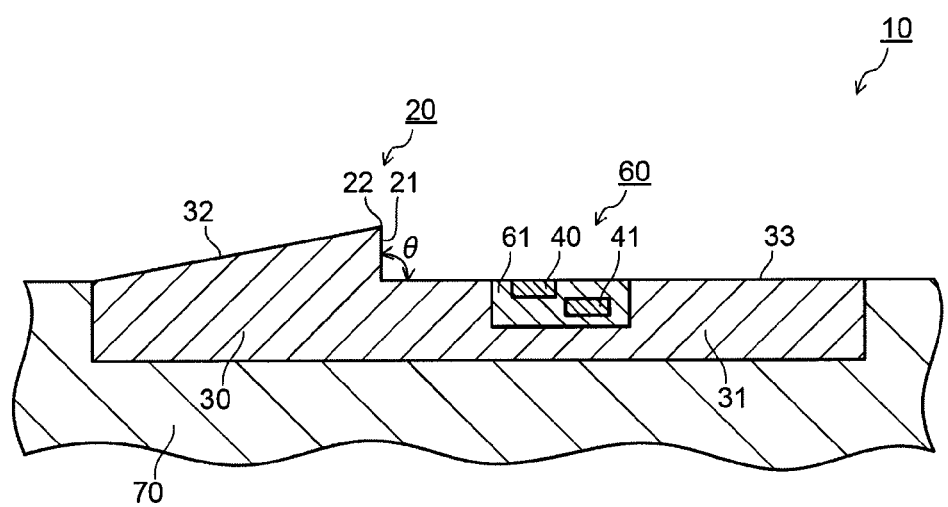
FIG. 3 is a view illustrating another structure of the airflow control device in the first embodiment, and is a view illustrating a cross-section corresponding to the cross-section taken along A-A in FIG. 1.

Incidentally, the first electrode 40 and the second electrode 41 are not limited to the structure in which the first electrode 40 and the second electrode 41 are directly provided in the downstream side structure portion 31. FIG. 3 is a view illustrating another structure of the airflow control device 10 in the first embodiment, and is a view illustrating a cross-section corresponding to the cross-section taken along A-A in FIG. 1.

As illustrated in FIG. 3, the pair of electrodes may also be formed as a removable electrode unit 60 in which the first electrode 40 and the second electrode 41 are provided in a dielectric structure 61 formed of a dielectric material. In the above case, the downstream side structure portion 31 is not required to be formed of a dielectric material, and can be formed of an arbitrary material suitable for usage.

Next, the operation of the airflow control device 10 in the first embodiment will be explained.

Here, there will be explained a state where the airflow flows when the airflow control device 10 is provided in a leading edge portion of a blade 70. First, for comparison, the flow of the airflow on the blade 70 when the airflow control device 10 is not provided will be explained.

Figure 4:
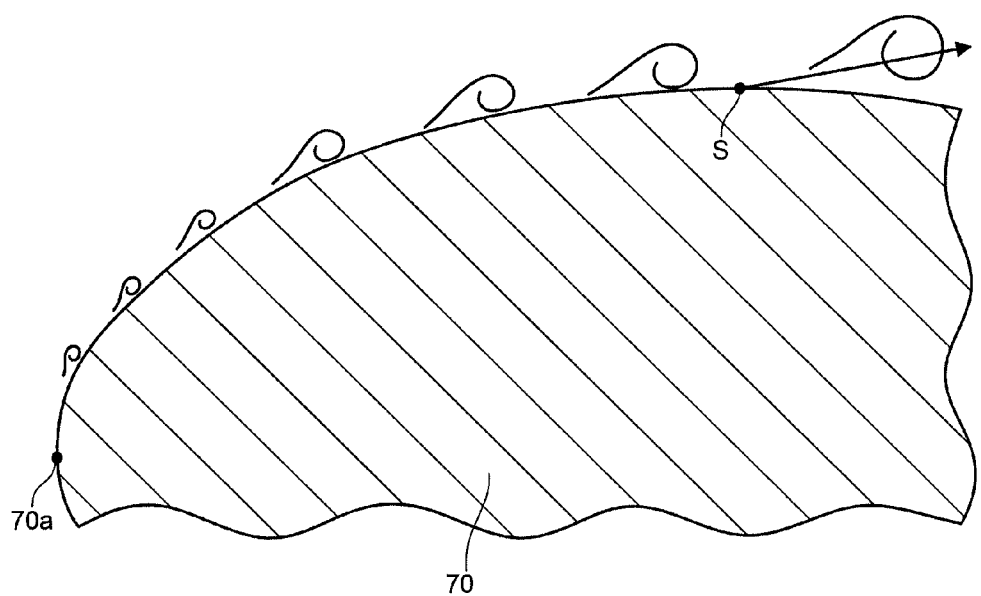
FIG. 4 is a view schematically illustrating flow of an airflow on a blade when the airflow control device in the first embodiment is not provided.

FIG. 4 is a view schematically illustrating the flow of the airflow on the blade 70 when the airflow control device 10 in the first embodiment is not provided. Incidentally, in FIG. 4, the flow on a surface of the leading edge portion of the blade 70 is illustrated in an enlarged manner.

As illustrated in FIG. 4, in the vicinity of a stagnation point 70*a* near the leading edge of the blade 70, a minute transverse vortex occurs because the boundary layer is unstable. As the transverse vortex flows downstream, the transverse vortex is united to grow, and then at a separation point S, the transverse vortex is discharged as a large-scale separation bubble. A discharge frequency of a large-scale separation vortex at this time mainly relays on the profile of the blade and the main flow velocity. However, a discharge frequency of the minute transverse vortex, being also a seed of the separation vortex, relays on a turbulent state of the main flow or a state of the blade surface, resulting in that it is difficult to accurately estimate the discharge frequency.

When plasma to be generated in the airflow control device 10 is controlled by the pulse modulation, it is necessary to tune the pulse modulation frequency to the discharge frequency of the above minute transverse vortex, but it is difficult to estimate the frequency of the transverse vortex. Thus, there arises a need to detect the frequency by a sensor such as a surface pressure sensor, thereby increasing the cost of the device.

Next, the operation when the airflow control device 10 in the first embodiment is provided in a suction side of a leading edge side of the blade 70 will be explained.

First, the flow when an angle of attack of the blade 70 is small will be explained.

Figure 5:
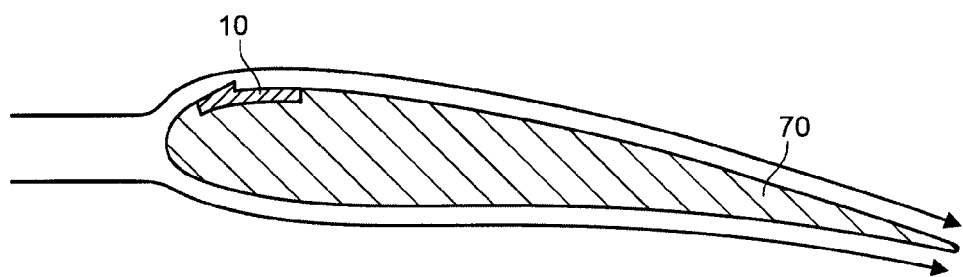
FIG. 5 is a view schematically illustrating a state where the airflow flows when the airflow control device in the first embodiment is provided in a leading edge portion of the blade.
Figure 6:
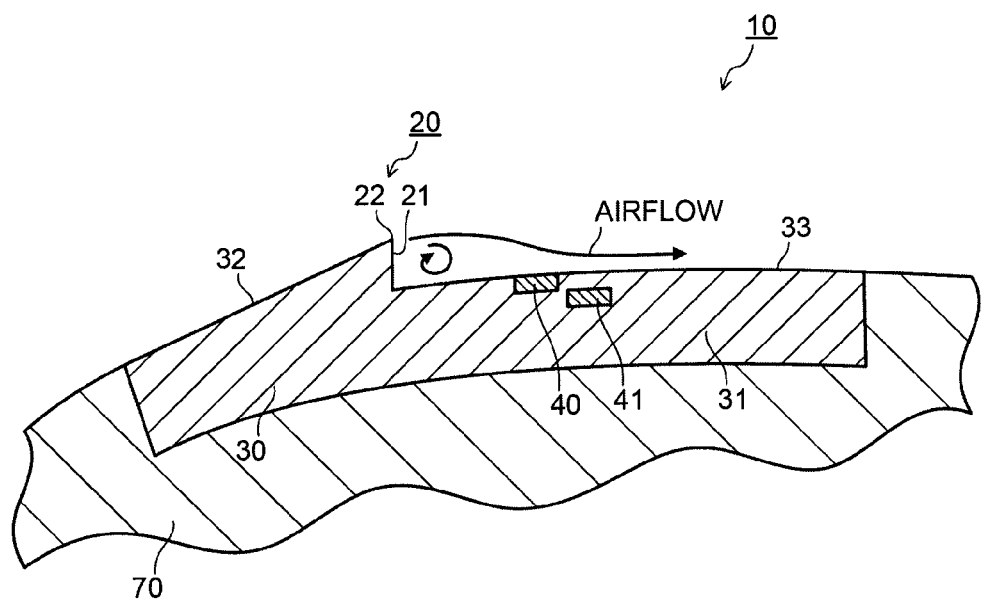
FIG. 6 is an enlarged view illustrating the flow of the airflow on a surface of the airflow control device in the first embodiment in the state illustrated in FIG. 5.

FIG. 5 is a view schematically illustrating a state where the airflow flows when the airflow control device 10 in the first embodiment is provided in the suction side of the leading edge side of the blade 70. FIG. 6 is an enlarged view illustrating the flow of the airflow on the surface of the airflow control device 10 in the first embodiment in the state illustrated in FIG. 5.

Here, as illustrated in FIG. 5, for example, the airflow control device 10 is installed in the blade 70 so that only the portion forming the inclined surface 32 of the upstream side structure portion 30 is in a state of projecting from the surface of the blade 70. That is, it is formed so that the airflow having flowed through on the surface of the blade 70 flows on the surface 32 of the upstream side structure portion 30 smoothly without passing through a step or the like.

As illustrated in FIG. 5 and FIG. 6, when the angle of attack of the blade 70 is small, the airflow flows along the surface of the blade 70. The airflow flowing from the leading edge to the suction side of the blade 70 passes through on the airflow control device 10 to then flow to a tailing edge side. On this occasion, large-scale separation does not occur.

As illustrated in FIG. 6, when the airflow passes through the intersecting edge portion 22 of the vortex shedding structure portion 20, small-scale separation and reattachment on the downstream side of the separation occur. In this manner, from the vortex shedding structure portion 20, a small-scale vortex flow having an axis parallel to the intersecting edge portion 22 (transverse vortex) that is accompanied by the separation is intermittently discharged in the flow direction. A discharge frequency of the above vortex flow is distributed with peaks at the dominant frequency fs centrally, and is expressed by the function of the height H of the stepped portion 21 of the vortex shedding structure portion 20 and the main flow velocity U of the airflow flowing on the surface of the airflow control device 10, as expressed in Expression (1) described above. By decreasing the height H of the stepped portion 21 with respect to the blade thickness or the chord length, the effect of the separation and reattachment of the flow to occur when the airflow passes through the vortex shedding structure portion 20 on lift characteristics of the blade becomes small enough to be negligible.

Next, the flow when the angle of attack of the blade 70 is large will be explained.

Figure 7:
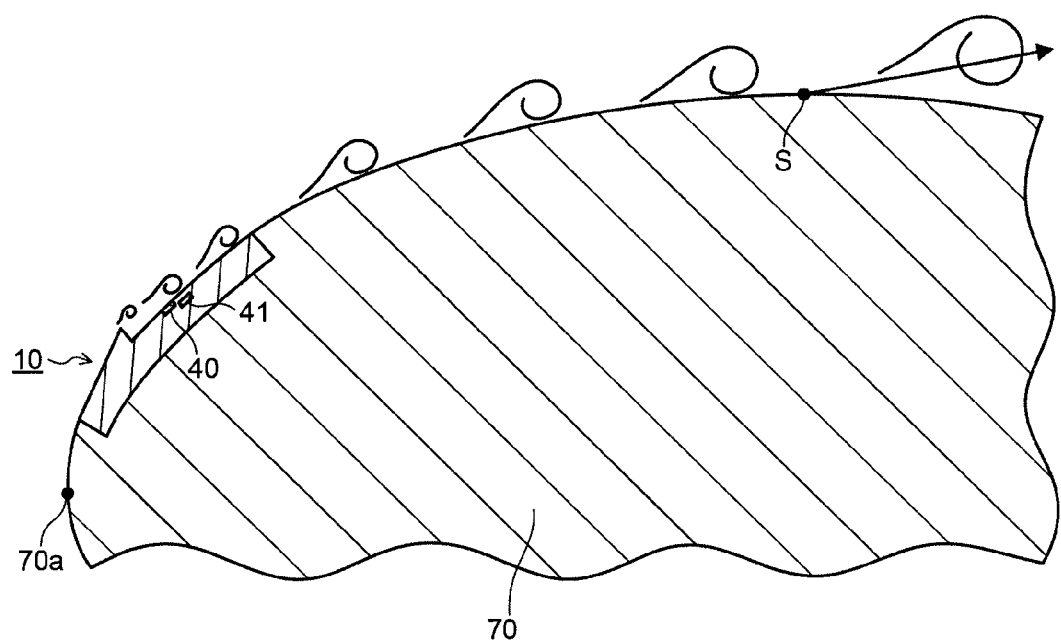
FIG. 7 is a view schematically illustrating the flow of the airflow on the blade when the airflow control device in the first embodiment is provided and the airflow control device is not operated.
Figure 8:
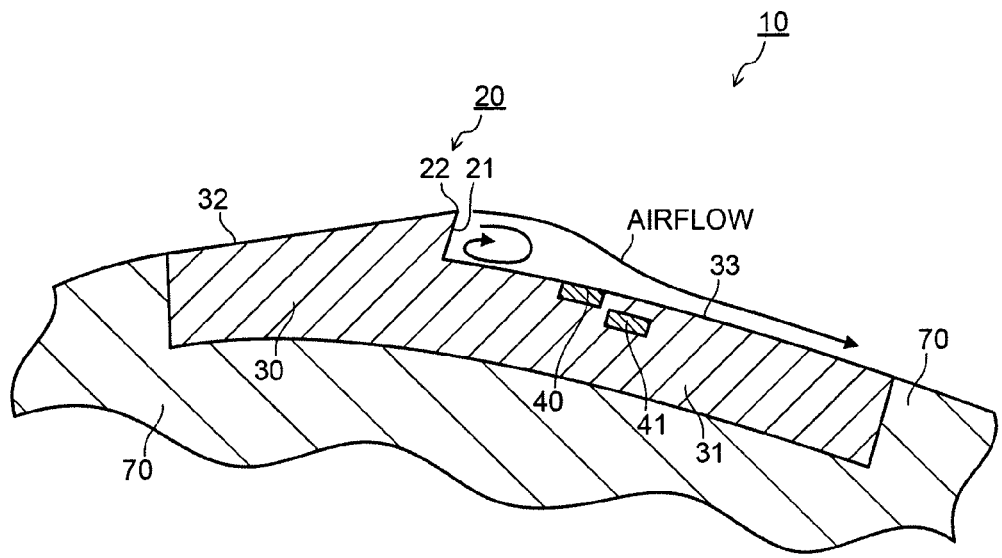
FIG. 8 is an enlarged view illustrating the flow of the airflow on the surface of the airflow control device when the airflow control device in the first embodiment is provided in the leading edge portion of the blade and the airflow control device is not operated.
Figure 9:
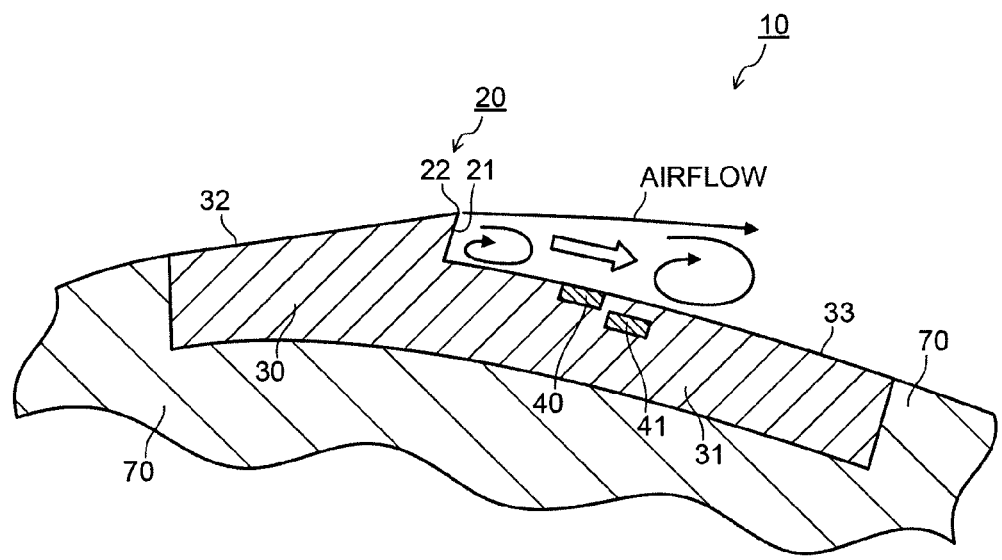
FIG. 9 is an enlarged view illustrating the flow of the airflow on the surface of the airflow control device when the airflow control device in the first embodiment is provided in a suction side of a leading edge side of the blade and the airflow control device is not operated.

FIG. 7 is a view schematically illustrating the flow of the airflow on the blade 70 when the airflow control device 10 in the first embodiment is provided and the airflow control device 10 is not operated. Incidentally, in FIG. 7, the flow on the surface of the suction side of the leading edge portion of the blade 70 is illustrated in an enlarged manner. FIG. 8 and FIG. 9 are enlarged views each illustrating the flow of the airflow on the surface of the airflow control device 10 when the airflow control device 10 in the first embodiment is provided in the suction side of the leading edge side of the blade 70 and the airflow control device 10 is not operated.

Figure 10:
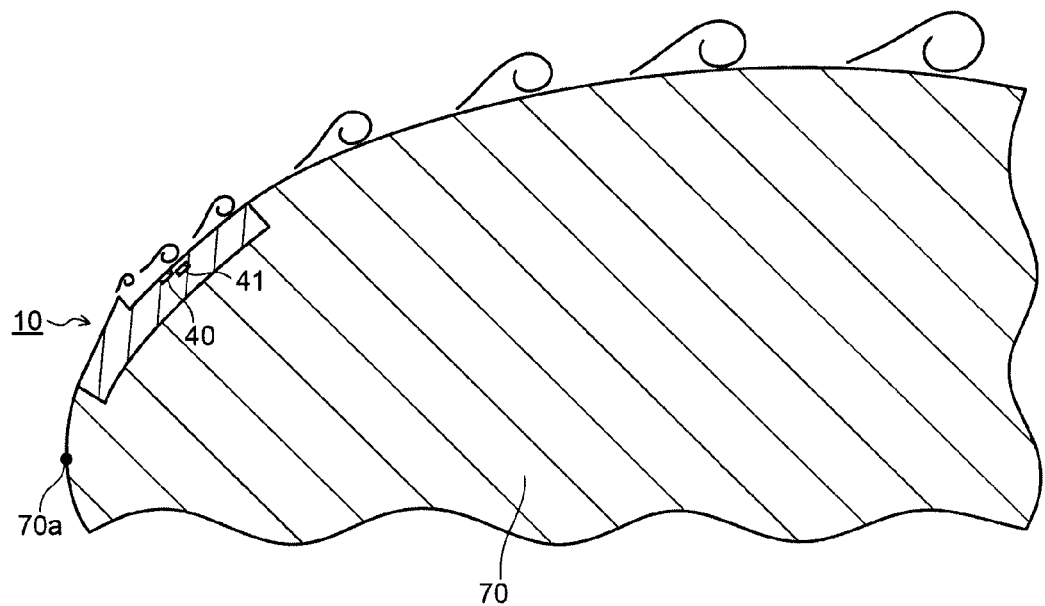
FIG. 10 is a view schematically illustrating the flow of the airflow on the blade when the airflow control device in the first embodiment is provided and the airflow control device is operated.

FIG. 10 is a view schematically illustrating the flow of the airflow on the blade 70 when the airflow control device 10 in the first embodiment is provided and the airflow control device 10 is operated. Note that in FIG. 10, the flow on the surface of the leading edge portion of the blade 70 is illustrated in an enlarged manner.

As illustrated in FIG. 7, when the angle of attack of the blade 70 is increased, a transverse vortex occurs when the airflow passes through on the intersecting edge portion 22 of the vortex shedding structure portion 20, and the above transverse vortex is discharged intermittently in the flow direction. The above transverse vortex is in an unsteady state, where the state of the transverse vortex being attached illustrated in FIG. 8 and the state of the transverse vortex being separated illustrated in FIG. 9 are repeated alternately, on the downstream side of the intersecting edge portion 22.

Then, as the above transverse vortex flows downstream, the transverse vortex is united to grow, and the thickness of the boundary layer is increased, and at the separation point S, the transverse vortex is discharged as a large-scale separation bubble, and the flow is separated on a large scale. The position of the separation point S is determined according to the shape of the blade 70, the main flow velocity, or the like.

When the above large-scale separation occurs, the airflow control device 10 is operated. An alternating voltage is applied between the first electrode 40 and the second electrode 41 by the discharge power supply 51 to generate plasma on the surface. Force that ions in the plasma receive from an electric field is transmitted to gas, and thereby a plasma induced flow occurs.

Note that it is preferable to cause the plasma induced flow to occur so as to flow in the flow direction of the airflow. When the plasma induced flow occurs, the low velocity portion of the boundary layer of the airflow is accelerated by the plasma induced flow to effectively affect velocity distribution.

For example, when the alternating voltage is applied, the plasma intermittently occurs according to the frequency of the alternating voltage, and thereby the plasma induced flow intermittently occurs in accordance with the cycle of the alternating voltage. Further, when the pulse modulation control of intermittently controlling the application of voltage is performed in applying the alternating voltage, the plasma induced flow intermittently occurs corresponding to the frequency of the above pulse modulation control.

The state of the transverse vortex on the downstream side of the intersecting edge portion 22 is in an unsteady state as described previously. For example, when the frequency at which the alternating voltage is applied, or a frequency fc of the pulse modulation, namely, the frequency of the plasma induced flow to occur intermittently is tuned to the dominant frequency fs of the vortex flow discharged from the vortex shedding structure portion 20, the transverse vortices having been discharged from the intersecting edge portion 22 resonate to have energy applied thereto, and thereby the transverse vortices are strengthened.

Then, the transverse vortices having been strengthened and discharged intermittently interfere with each other, and thereby longitudinal vortices occur. Then, by a longitudinal vortex structure of the longitudinal vortices, exchange of a momentum in the high velocity portion and a momentum of the low velocity portion in the boundary layer advances, and the low velocity portion of the boundary layer is prominently accelerated.

For this reason, as illustrated in FIG. 10, the large-scale separation is suppressed, and the airflow flows along the blade surface so as to attach to the blade surface. Accordingly, in the case of the blade, an effect of improvement of a lift or the like is obtained. Incidentally, even when the large-scale separation is not suppressed completely, the flow of the airflow is drawn to the blade side, and thereby pressure distribution is improved, and an effect of improvement of a lift, or the like is obtained.

Here, the frequency at which the above-described alternating voltage is applied, or the frequency fc of the pulse modulation is set based on the dominant frequency fs of the discharge frequency of the vortex f low calculated from the relational expression of Expression (1) described previously. Incidentally, the frequency fc need not be equal to the dominant frequency fs completely, and as long as the frequency fc is a value in a range of ±10% of the dominant frequency fs, a sufficient effect of controlling the airflow is obtained. When the dominant frequency fs of the vortex flow and the frequency at which the alternating voltage is applied or the frequency fc of the pulse modulation are not equal, the dominant frequency fs converges with the frequency fc.

The dominant frequency fs of the discharge frequency of the vortex flow can be calculated based on the height H of the stepped portion 21 of the vortex shedding structure portion 20 and the main flow velocity U of the airflow flowing on the surface of the airflow control device 10 from the relational expression of Expression (1) described previously. For this reason, for example, the dominant frequencies fs based on various combinations of the height H of the stepped portion 21 and the main flow velocity U of the airflow are compiled into a database beforehand, and at the time of operation, only the main flow velocity is determined, and thereby the dominant frequency fs can be determined. This makes it possible to easily control the frequency of the alternating voltage.

As described above, according to the airflow control device 10 in the first embodiment, by controlling the frequency at which the alternating voltage is applied, or the frequency fc of the pulse modulation, the varying airflow can be controlled easily and accurately without providing a fluid variation sensor or the like. Further, the frequency at which the alternating voltage is applied, or the frequency fc of the pulse modulation can be set based on the dominant frequency fs of the discharge frequency of the vortex flow. Further, the above dominant frequency fs can be determined by the geometric shape or the like of the vortex shedding structure portion 20. Thus, the dominant frequency fs can be set easily without considering the degree of turbulence of the airflow, the state of an object surface on which the airflow flows, and the like.

Figure 11:
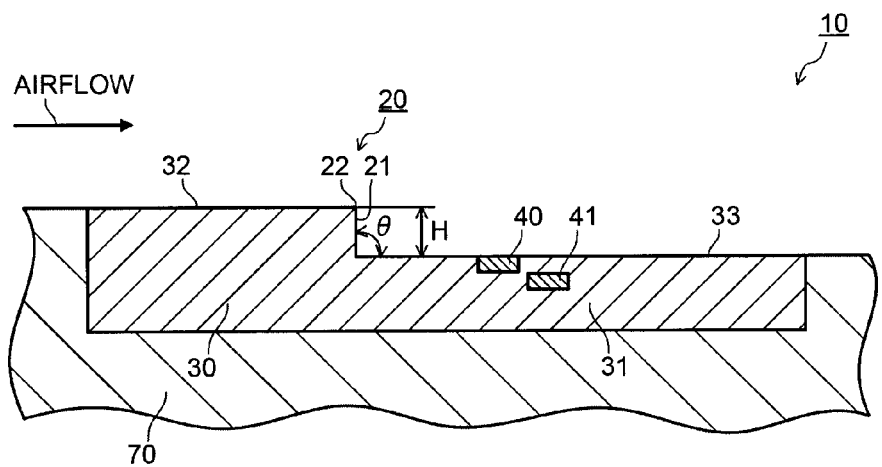
FIG. 11 is a view illustrating a cross-section of another structure of the airflow control device in the first embodiment, and schematically illustrates a state where the airflow control device in the first embodiment in another structure is provided in the blade.

Here, the structure of the airflow control device 10 in the first embodiment is not limited to the above-described structure. FIG. 11 is a view illustrating a cross-section of another structure of the airflow control device 10 in the first embodiment, and schematically illustrates a state where the airflow control device 10 in the first embodiment in another structure is provided in the blade 70.

As illustrated in FIG. 11, the surface 32 of the upstream side structure portion 30 may also be formed into a plane surface parallel to the flow of the airflow. In the above case, the whole airflow control device 10 is buried in the blade 70 to prevent the projection of the airflow control device 10 from the surface of the blade 70. Thereby, the airflow flows through on the surface 32 of the upstream side structure portion 30 smoothly without passing through a step or the like.

The surface on an end portion side of the downstream side structure portion 31 extending to the surface of the blade 70 is formed so that the airflow having passed through on the surface of the downstream side structure portion 31 flows on the surface of the blade 70 smoothly without passing through a step or the like.

Note that the surface 32 of the upstream side structure portion 30 may also be formed into not only the plane surface parallel to the flow of the airflow, but also, for example, an inclined surface inclined downward in the flow direction of the airflow.

Even in the case when the upstream side structure portion 30 is formed in this manner, it is possible to obtain operations and effects similar to those in the above-described case where the surface 32 of the upstream side structure portion 30 is formed into the inclined surface that projects toward the airflow side as it goes in the flow direction of the airflow. Note that even in either case, the height H of the stepped portion 21 of the vortex shedding structure portion 20 is set to fall within the previously described range.

Figure 12:
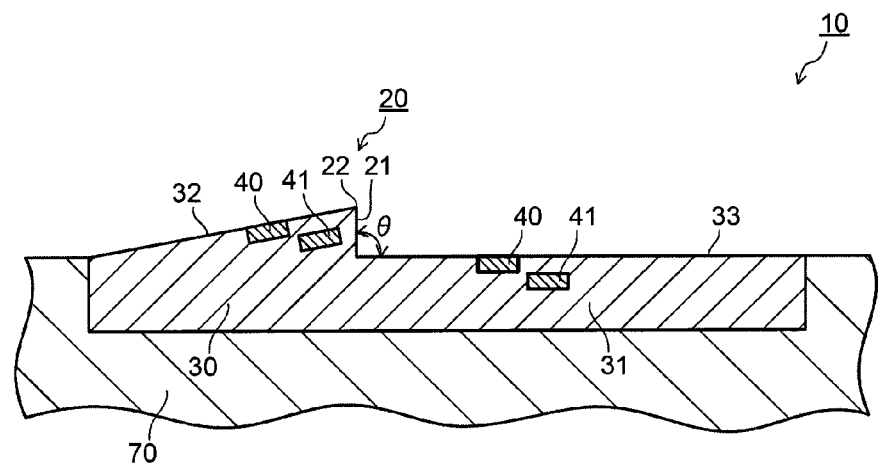
FIG. 12 is a view illustrating a cross-section of still another structure of the airflow control device in the first embodiment, and is a view illustrating the cross-section corresponding to the cross-section taken along A-A in FIG. 1.

Further, here, although there has been de scribed one example where the first electrode 40 and the second electrode 41 for generating the plasma induced flow are provided only in the downstream side structure portion 31, the airflow control device 10 is not limited to the above structure. FIG. 12 is a view illustrating a cross-section of still another structure of the airflow control device 10 in the first embodiment, and is a view illustrating the cross-section corresponding to the cross-section taken along A-A in FIG. 1.

As illustrated in FIG. 12, for example, the first electrode 40 and the second electrode 41 may also be further provided in the upstream side structure portion 30 on the immediate upstream side of the intersecting edge portion 22. Thereby, it is possible to generate the plasma induced flow on the surface 32 of the upstream side structure portion 30 on the immediate upstream side of the intersecting edge portion 22. Incidentally, it is also possible that the first electrode 40 is provided on the surface of the upstream side structure portion 30 on the immediate upstream side of the intersecting edge portion 22 and the second electrode 41 is buried at a position close to the surface of the stepped portion 21 on the immediate downstream side of the intersecting edge portion 22.

A power supply that applies the alternating voltage between the first electrode 40 and the second electrode 41 provided in the vicinity of the intersecting edge portion 22 may be provided separately from the discharge power supply 51, or the discharge power supply 51 may also be served as the above power supply. Further, the power supply may also include the pulse modulation function that applies a voltage between the first electrode 40 and the second electrode 41 in a manner to increase/decrease or turn on/off the voltage intermittently at a cycle different from that of the alternating voltage.

In this manner, by generating the plasma induced flow also in the vicinity of the intersecting edge portion 22, it is possible to increase the adjustment function of the dominant frequency fs at which the vortex flow at the vortex shedding structure portion 20 is discharged.

The dominant frequency fs, as described previously, is basically expressed by the function of the main flow velocity U and the height H of the stepped portion 21, but sometimes varies affected by dirt or raindrops on the blade surface. The frequency of the alternating voltage to be applied between the first electrode 40 and the second electrode 40 provided in the vicinity of the intersecting edge portion 22 is set to fcu. When the frequency fcu is substantially equal to the dominant frequency fs, the dominant frequency fs of the vortex flow is affected by fcu to converge with fcu. For this reason, it is possible to discharge the vortex at the frequency fcu without the effect of dirt or raindrops.

To the discharge frequency of the above vortex, a frequency fcd of the alternating voltage to be applied between the first electrode 40 and the second electrode 41 provided in the downstream side structure portion 31 positioned downstream from the first electrode 40 and the second electrode 41 is tuned. Thereby, a separation suppression effect as described above is obtained. That is, the frequency fcd is preferably set to the same as the frequency fcu, or preferably set to fall within a range of ±10% of the frequency fcu.

Further, the above effect is obtained as a result that the frequency of the plasma induced flow to occur intermittently is controlled. For this reason, when the plasma induced flow is intermittently generated by the pulse modulation control, similarly to a pulse modulation frequency, the pulse modulation frequency to be applied between the first electrode 40 and the second electrode 41 provided in the downstream side structure portion 31 is preferably set to a frequency close to the pulse modulation frequency to be applied between the first electrode 40 and the second electrode 41 provided in the vicinity of the intersecting edge portion 22. Concretely, the pulse modulation frequency to be applied between the first electrode 40 and the second electrode 41 provided in the downstream side structure portion 31 is preferably controlled to fall within a range of ±10% of the pulse modulation frequency to be applied between the first electrode 40 and the second electrode 41 provided in the vicinity of the intersecting edge portion 22.

Figure 13:
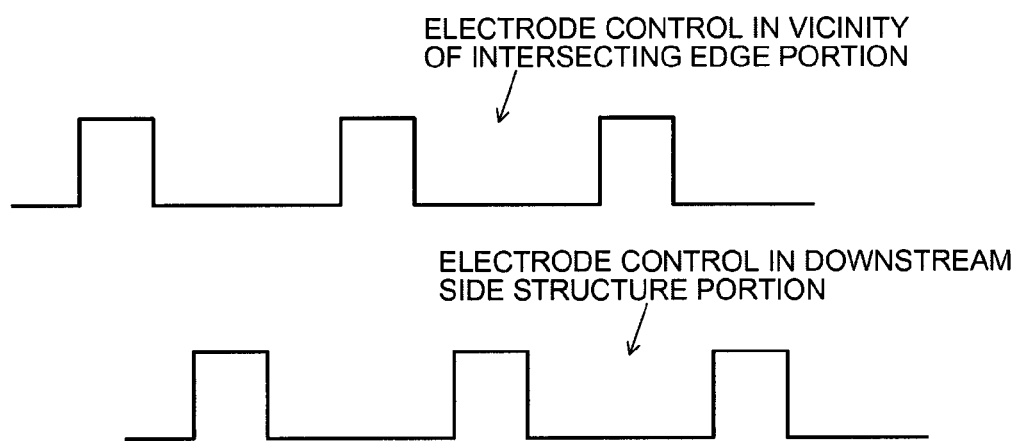
FIG. 13 is a view illustrating application timing of an alternating voltage to be applied between a first electrode and a second electrode provided in the vicinity of an intersecting edge portion and application timing of an alternating voltage to be applied between a first electrode and a second electrode provided in a downstream side structure portion, in the airflow control device in the first embodiment illustrated in FIG. 12.

FIG. 13 is a view illustrating application timing of the alternating voltage to be applied between the first electrode 40 and the second electrode 41 provided in the vicinity of the intersecting edge portion 22 and application timing of the alternating voltage to be applied between the first electrode 40 and the second electrode 41 provided in the downstream side structure portion 31, in the airflow control device 10 in the first embodiment illustrated in FIG. 12.

As illustrated in FIG. 13, it is preferable to provide a phase difference between the application timing of the alternating voltage to be applied between the first electrode 40 and the second electrode 41 provided in the vicinity of the intersecting edge portion 22 and the application timing of the alternating voltage to be applied between the first electrode 40 and the second electrode 41 provided in the downstream side structure portion 31.

By shifting the application timing of the alternating voltage in this manner, the maximum current of a power supply circuit can be suppressed to be small as compared with the case when the alternating voltages are applied simultaneously. This makes it possible to achieve a decrease in size of the power supply and a decrease in usage cost. Further, also in the pulse modulation control of intermittently controlling the application of voltage, application timing is shifted, and thereby a similar effect can be obtained.

Second Embodiment

An airflow control device 11 in a second embodiment has the same structure as that of the airflow control device 10 in the first embodiment except that the shape of the intersecting edge portion 22 of the vortex shedding structure portion 20 is different. Here, the structure of the different intersecting edge portion 22 of the vortex shedding structure portion 20 will be explained mainly.

Figure 14:
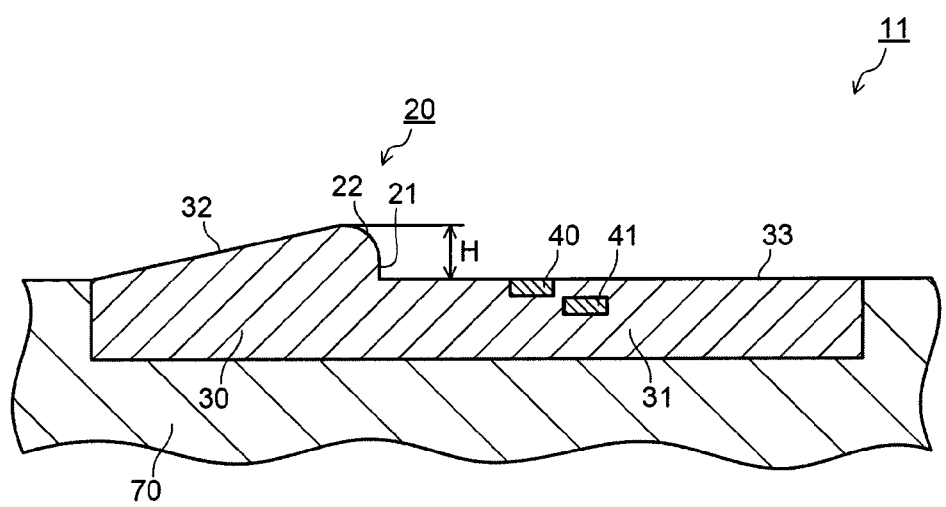
FIG. 14 is a view illustrating, in an airflow control device in a second embodiment, a cross-section corresponding to the cross-section taken along A-A in FIG. 1.

FIG. 14 is a view illustrating, in the airflow control device 11 in the second embodiment, a cross-section corresponding to the cross-section taken along A-A in FIG. 1.

The airflow control device 11 in the second embodiment includes a vortex shedding structure portion 20 that intermittently discharges an airflow flowing on a surface in a flow direction as a vortex flow. The above vortex shedding structure portion 20, as illustrated in FIG. 14, is formed of a stepped portion 21 formed at the boundary between an upstream side structure portion 30 having the airflow flow on a surface 32 and extended in the flow direction of the airflow and a downstream side structure portion 31 whose surface 33 is recessed in a stepped manner from the surface 32 of the upstream side structure portion 30 to be extended in the flow direction of the airflow.

In this manner, the stepped portion 21 is formed at the boundary between the upstream side structure portion 30 and the downstream side structure portion 31. The boundary between the stepped portion 21 and the upstream side structure portion 30, namely an intersecting edge portion 22 where the upstream side structure portion 30 and the stepped portion 21 intersect is formed of a convex curved surface.

Here, as illustrated in FIG. 14, the stepped portion 21 is formed of the curved surface forming the intersecting edge portion 22 and a plane surface extending from an end portion of the above curved surface to the surface 33 of the downstream side structure portion 31. Incidentally, the stepped portion 21 may also be formed of the curved surface forming the intersecting edge portion 22 without having the plane surface portion.

Incidentally, as illustrated in FIG. 14, a height H of the stepped portion 21 of the vortex shedding structure portion 20 is the length of a perpendicular line dropped from the uppermost projecting point of the intersecting edge portion 22 to the surface 33, or to the same plane surface as the surface 33.

The height H of the stepped portion 21 is preferably set to 0.10 or less, and more preferably set to 0.01% or less or so of the representative length of a fluid phenomenon to which the airflow control device 11 is applied (the chord length in the case of leading edge separation of a blade). Alternatively, the height H of the stepped portion 21 is preferably set to not less than 5 μm nor more than 500 μm in the actual measurement within a range of Reynolds number being $1 \times 10^4$ to $1 \times 10^7$, or set to $10 \times U/v$ or less (in which U denotes a main flow velocity and v denotes a dynamic viscosity).

The reason why these ranges are preferable is because in the case of the function of the airflow control device 11 being unnecessary, it is necessary to make the step to the degree that the structure of the airflow control device 11 does not cause fluid resistance. Thus, the height H of the stepped portion 21 is required to be set to equal to or less than the thickness of a viscous sublayer of a turbulent boundary layer controlling frictional resistance.

In the vortex shedding structure portion 20, when the airflow having flowed through on the surface of the upstream side structure portion 30 passes through the intersecting edge portion 22, the airflow is intermittently discharged in the flow direction as a vortex flow. A discharge frequency at which the above vortex flow is discharged is distributed with peaks at a dominant frequency fs centrally. The above dominant frequency fs can be expressed by a function of a boundary layer thickness δs at a separation point S1 on the vortex shedding structure portion 20 and the main flow velocity U of the airflow flowing on a surface of the airflow control device 11 by later-described Expression (2).

The operation of the airflow control device 11 in the second embodiment is basically similar to that of the airflow control device 10 in the first embodiment, and thus will be explained with reference to FIG. 7 to FIG. 10.

As illustrated in FIG. 7, when an angle of attack of a blade 70 is increased, a transverse vortex occurs when the airflow passes through the intersecting edge portion 22 of the vortex shedding structure portion 20, and the above transverse vortex is discharged intermittently in the flow direction. The above transverse vortex is in an unsteady state, where the state of the transverse vortex being attached as illustrated in FIG. 8 and the state of the transverse vortex being separated as illustrated in FIG. 9 are repeated alternately, on a downstream side of the intersecting edge portion 22.

Then, as the above transverse vortex flows downstream, the transverse vortex is united to grow, and the thickness of the boundary layer is increased, and at the separation point S on the blade surface, the transverse vortex is discharged as a large-scale separation bubble, and the flow is separated on a large scale. The position of the separation point S is determined according to the shape of the blade 70, the main flow velocity, or the like.

In the case when the above large-scale separation occurs, the airflow control device 11 is operated. An alternating voltage is applied between a first electrode 40 and a second electrode 41 by a discharge power supply 51 to generate plasma on the surface. Force that ions in the plasma receive from an electric field is transmitted to gas, and thereby a plasma induced flow occurs.

Note that it is preferable to cause the plasma induced flow to occur so as to flow in the flow direction of the airflow. When the plasma induced flow occurs, the low velocity portion of the boundary layer of the airflow is accelerated by the plasma induced flow to effectively affect velocity distribution.

For example, when pulse modulation control of intermittently controlling the application of voltage is performed in applying the alternating voltage, the plasma induced flow intermittently occurs corresponding to the above control. The state of the transverse vortex on the downstream side of the intersecting edge portion 22 is in an unsteady state as described previously. For example, when a frequency fc at which the alternating voltage is applied is tuned to the dominant frequency fs of the vortex flow discharged from the vortex shedding structure portion 20, the transverse vortices having been discharged from the intersecting edge portion 22 resonate to have energy applied thereto, and thereby the transverse vortices are strengthened.

Then, the transverse vortices having been strengthened and discharged intermittently interfere with each other, and thereby longitudinal vortices occur, and by a longitudinal vortex structure of the longitudinal vortices, exchange of a momentum in the high velocity portion and a momentum of the low velocity portion in the boundary layer advances, and the low velocity portion of the boundary layer is prominently accelerated.

For this reason, as illustrated in FIG. 10, the large-scale separation is suppressed, and the airflow flows along the blade surface so as to attach to the blade surface. Accordingly, in the case of the blade, an effect of improvement of a lift or the like is obtained. Incidentally, even when the large-scale separation is not suppressed completely, the flow of the airflow is drawn to the blade side, and thereby pressure distribution is improved, and an effect of improvement of a lift, or the like is obtained.

Figure 15:
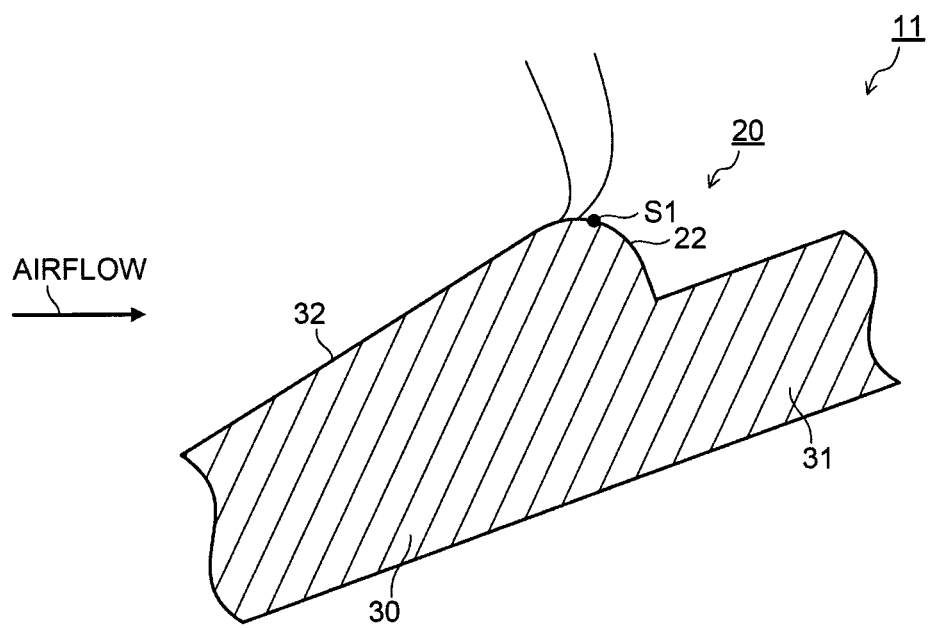
FIG. 15 is an enlarged view illustrating, in the airflow control device in the second embodiment, an intersecting edge portion on the cross-section corresponding to the cross-section taken along A-A in FIG. 1.

FIG. 15 is an enlarged view illustrating, in the airflow control device 11 in the second embodiment, the intersecting edge portion 22 on the cross-section corresponding to the cross-section taken along A-A in FIG. 1. Note that FIG. 15 illustrates the case where the airflow control device 11 is installed so as to have a negative inclination angle (an inclination angle inclined downward to the left in FIG. 15) with respect to the flow.

As illustrated in FIG. 15, when the airflow control device 11 is installed so as to have a negative inclination angle (an inclination angle inclined downward to the left in FIG. 15), the flow flows down on the curved surface portion of the intersecting edge portion 22 and the boundary layer thickens. Then, at the time when a certain boundary layer thickness is obtained, the flow is separated and a minute transverse vortex is discharged (at the separation point S1).

In this manner, when the airflow control device 11 is installed so as to have a negative inclination angle (an inclination angle inclined downward to the left in FIG. 15), the separation point S1 is positioned at the downstream portion on the vortex shedding structure portion 20. For this reason, as will be described below, it becomes effective to apply the airflow control device 11 in this embodiment in which the downstream portion of the vortex shedding structure portion 20 is formed of the curved surface.

When the boundary layer thickness at this time is set to δs, the discharge frequency of the minute transverse vortex discharged from the airflow control device portion is distributed with peaks at the dominant frequency fs centrally. The above dominant frequency fs can be expressed by the function of the boundary layer thickness δs and the main flow velocity U of the airflow flowing on the surface of the airflow control device 11 by Expression (2) expressed below.

$$fs = B \times U/\delta s \qquad \text{Expression (2)}$$

Here, B is a constant.

Even when the angle of attack is further negatively increased and the negative inclination angle of the airflow control device 11 is increased, the separation of the flow occurs at the time when the boundary layer thickness reaches δs. The separation point S1 is positioned at a position different from that illustrated in FIG. 15. However, the boundary layer thickness at the time of separation becomes δs, so that the discharge frequency of the vortex becomes the dominant frequency fs expressed by Expression (2) described above. Thus, even though the angle of attack changes, the discharge frequency of the vortex does not change.

For example, when in the airflow control device 11, the frequency at which the alternating voltage is applied, or the frequency fc of the pulse modulation control is tuned to the dominant frequency fs of the vortex flow discharged from the vortex shedding structure portion 20, the dominant frequency fs of the vortex flow converges with the frequency at which the alternating voltage is applied, or the frequency fc of the pulse modulation control, as has been explained in the first embodiment.

As the frequency of the airflow control device 11, the dominant frequencies fs compiled into data corresponding to the main flow velocity U at the time of operation is only necessary to be used, and the correspondence to the change in the angle of attack is good.

As described above, according to the airflow control device 11 in the second embodiment, by controlling the frequency at which the alternating voltage is applied, or the frequency fc of the pulse modulation control, the varying airflow can be controlled easily and accurately without providing a fluid variation sensor or the like. Further, the frequency at which the alternating voltage is applied, or the frequency fc of the pulse modulation control can be set based on the dominant frequency fs of the discharge frequency of the vortex flow. Further, the above dominant frequency fs can be determined by the geometric shape or the like of the vortex shedding structure portion 20. For this reason, the dominant frequency fs can be set easily without considering the degree of turbulence of the airflow, the state of an object surface on which the airflow flows, and the like.

Third Embodiment

Figure 16:
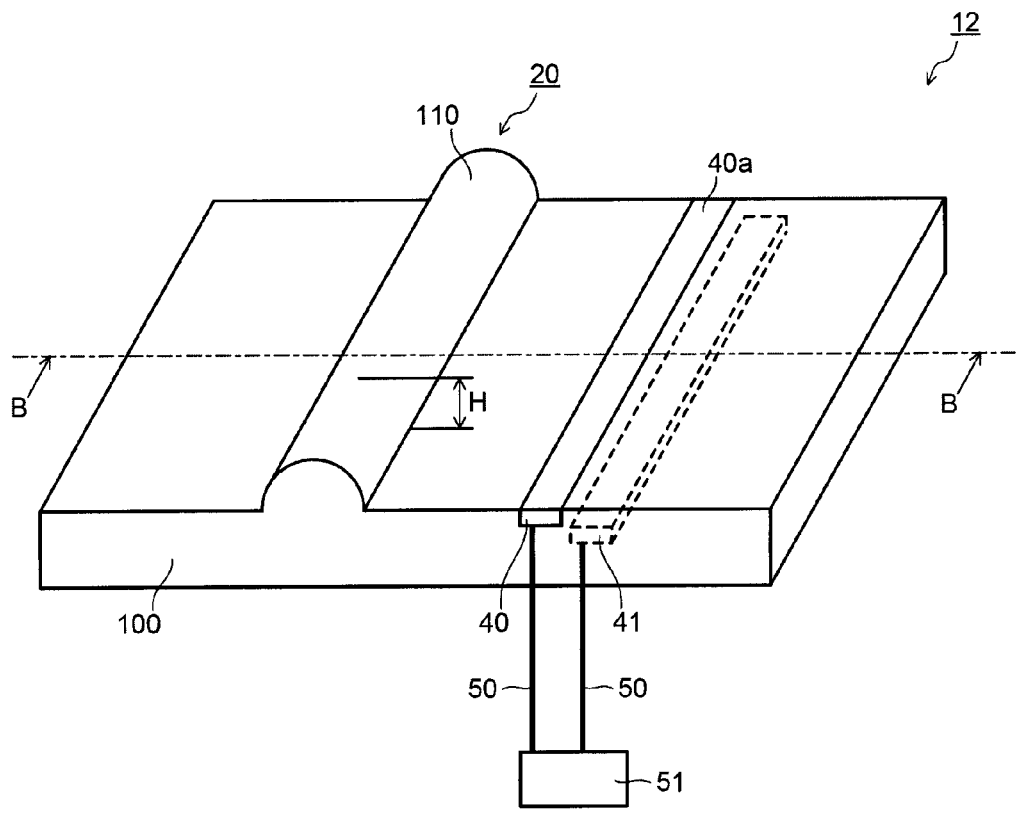
FIG. 16 is a perspective view of an airflow control device in a third embodiment.
Figure 17:
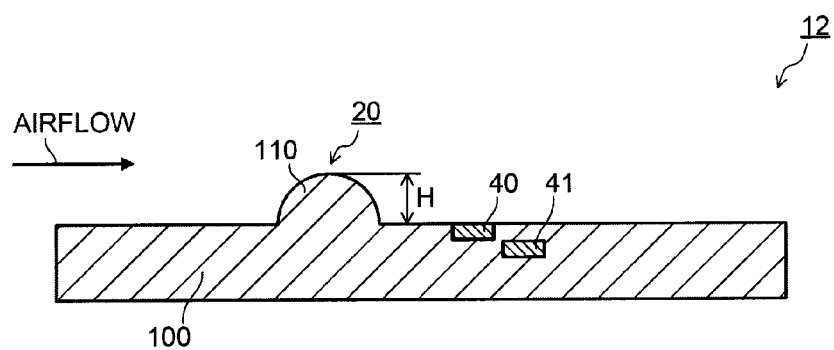
FIG. 17 is a view illustrating a cross-section taken along B-B in FIG. 16 in the airflow control device in the third embodiment.

FIG. 16 is a perspective view of an airflow control device 12 in a third embodiment. FIG. 17 is a view illustrating a cross-section taken along B-B in FIG. 16 in the airflow control device 12 in the third embodiment.

The airflow control device 12 in the third embodiment includes a vortex shedding structure portion 20 that intermittently discharges an airflow flowing on a surface in a flow direction as a vortex flow. The above vortex shedding structure portion 20, as illustrated in FIG. 16 and FIG. 17, is formed of a projecting portion 110 that projects to have a semicircular shape in a direction perpendicular to the flow direction of the airflow from a surface of a structure portion 100 on which the airflow flows. Note that the shape of the projecting portion 110 may also be formed into a semielliptical shape. Further, the airflow control device 12 includes a first electrode 40 and a second electrode 41 being a pair of electrodes on a downstream side of the vortex shedding structure portion 20.

The structure portion 100 is formed of a structure formed into a rectangular parallel piped or a cube. The material forming the structure portion 100 is formed of the previously described dielectric material when the first electrode 40 and the second electrode 41 are directly provided in the structure portion 100. Further, the electrode portion may also be formed as the removable electrode unit 60 described previously. In the above case, the structure portion 100 is not required to be formed of the dielectric material, and can be formed of an arbitrary material suitable for usage.

Figure 18:
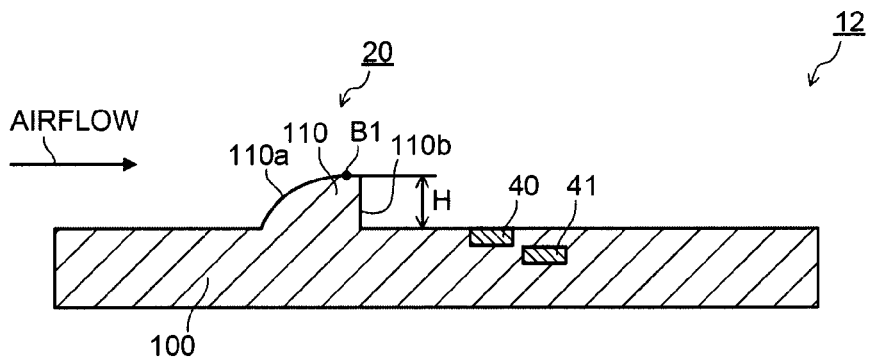
FIG. 18 is a view illustrating a cross-section, of another structure of the airflow control device in the third embodiment, corresponding to the cross-section taken along B-B in FIG. 16.

Incidentally, the vortex shedding structure portion 20 is only necessary to be formed of a projecting portion projecting to have a curved surface at least on its upstream side in the direction perpendicular to the flow direction of the airflow from the surface of the structure portion on which the airflow flows, and the vortex shedding structure portion 20 is not limited to the structure illustrated in FIG. 17. FIG. 18 is a view illustrating a cross-section corresponding to the cross-section taken along B-B in FIG. 16 in another structure of the airflow control device 12 in the third embodiment.

As illustrated in FIG. 18, the vortex shedding structure portion 20 may also be formed of a projecting portion 110 projecting to have its upstream side formed of a curved surface 110a and its downstream side formed of a plane surface 110b in the direction perpendicular to the flow direction of the airflow from the surface of the structure portion 100 on which the airflow flows. Incidentally, a separation point B1 where the flow is separated and a minute transverse vortex is discharged exists on the curved surface 110a. That is, at least the upstream side from the separation point B1 of the flow is formed of the curved surface 110a.

Figure 19:
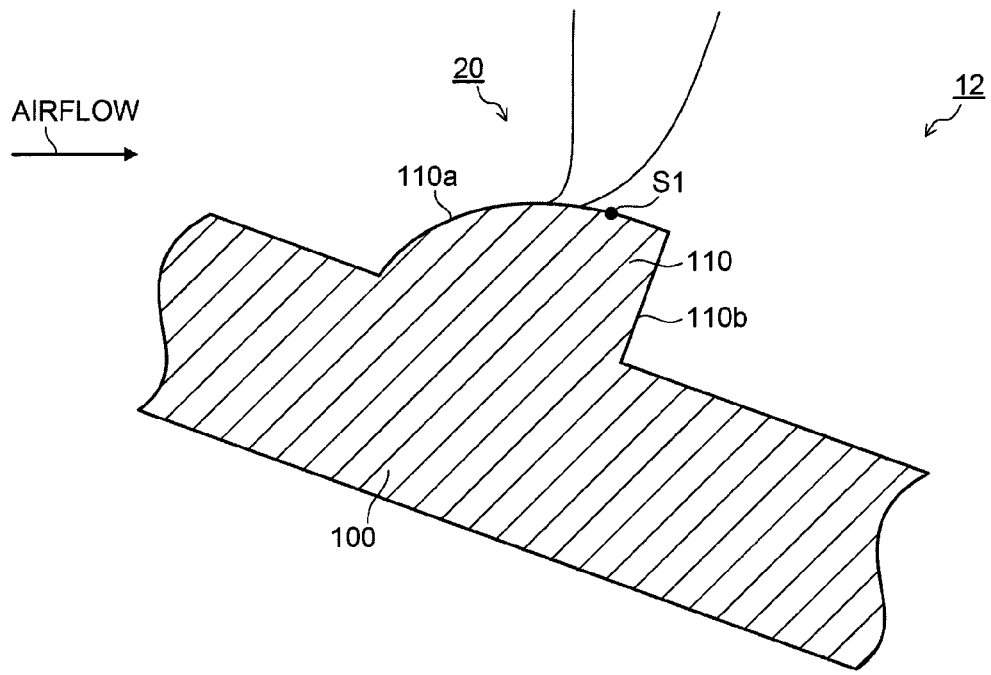
FIG. 19 is an enlarged view illustrating a projecting portion on the cross-section corresponding to the cross-section taken along B-B in FIG. 16 in the airflow control device in the third embodiment.

FIG. 19 is an enlarged view illustrating the projecting portion 110 on the cross-section corresponding to the cross-section taken along B-B in FIG. 16 in the airflow control device 12 in the third embodiment. Note that FIG. 19 illustrates the case where the airflow control device 12 is installed so as to have a positive inclination angle (an inclination angle inclined downward to the right in FIG. 19) with respect to the flow. Further, the projecting portion 110 will be explained taking the projecting portion 110 illustrated in FIG. 18 as an example.

As illustrated in FIG. 19, when the airflow control device 12 is installed so as to have a positive inclination angle (an inclination angle inclined downward to the right in FIG. 19), the flow flows down on the curved surface 110a of the projecting portion 110 and a boundary layer thickens. Then, at the time when a certain boundary layer thickness is obtained, the flow is separated (at a separation point S1).

In this manner, when the airflow control device 12 is installed so as to have a positive inclination angle (an inclination angle inclined downward to the right in FIG. 19), the separation point S1 is positioned at the upstream portion on the projecting portion 110. For this reason, as will be described below, it becomes effective to apply the airflow control device 12 in this embodiment in which the upstream portion of the projecting portion 110 is formed of the curved surface.

When the boundary layer thickness at this time is set to δs, a discharge frequency of a vortex at the time of separation is distributed with peaks at a dominant frequency fs centrally. The above dominant frequency fs can be expressed by a function of the boundary layer thickness δs and a main flow velocity U of the airflow flowing on a surface of the airflow control device 12 by Expression (3) expressed below.

$$fs = C \times U/\delta s \quad \text{Expression (3)}$$

Here, C is a constant.

Even when an angle of attack is further positively increased and the positive inclination angle of the airflow control device 12 is increased, the separation of the flow occurs at the time when the boundary layer thickness reaches δs. The separation point S1 is positioned at a position different from that illustrated in FIG. 19. However, the boundary layer thickness at the time of separation becomes δs, so that the discharge frequency of the vortex becomes the dominant frequency fs expressed by Expression (3) described above. Thus, even though the angle of attack changes, the discharge frequency of the vortex does not change.

A height H of the projecting portion 110 of the vortex shedding structure portion 20 is the length of a perpendicular line dropped from the uppermost projecting point of the projecting portion 110 to a surface 33, or to the same plane surface as the surface 33. The height H of the projecting portion 110 is preferably set to 0.1% or less, and more preferably set to 0.01% or less or so of the representative length of a fluid phenomenon to which the airflow control device 12 is applied (the chord length in the case of leading edge separation of a blade). Alternatively, the height H of the projecting portion 110 is preferably set to not less than 5 µm nor more than 500 µm in the actual measurement within a range of Reynolds number being $1 \times 10^4$ to $1 \times 10^7$, or set to $10 \times U/\nu$ or less (in which U denotes the main flow velocity and ν denotes a dynamic viscosity).

The reason why these ranges are preferable is because in the case of the function of the airflow control device 12 being unnecessary, it is necessary to make the projecting portion to the degree that the structure of the airflow control device 12 does not cause fluid resistance. Thus, the height H of the projecting portion 110 is required to be set to equal to or less than the thickness of a viscous sublayer of a turbulent boundary layer controlling frictional resistance.

A first electrode 40, a second electrode 41, a cable 50, and a discharge power supply 51 have the same structures as those in the airflow control device 10 in the first embodiment.

Next, the operation of the airflow control device 12 in the third embodiment will be explained.

The operation of the airflow control device 12 in the third embodiment is basically similar to that of the airflow control device 10 in the first embodiment, and thus will be explained with reference to FIG. 7 to FIG. 10.

As illustrated in FIG. 7, when the angle of attack of a blade 70 is increased, a transverse vortex occurs when the airflow passes through the projecting portion 110, and the above transverse vortex is discharged intermittently in the flow direction. The above transverse vortex is in an unsteady state, where the state of the transverse vortex being attached as illustrated in FIG. 8 and the state of the transverse vortex being separated as illustrated in FIG. 9 are repeated alternately, on the downstream side of the projecting portion 110.

Then, as the above transverse vortex flows downstream, the transverse vortex is united to grow, and the thickness of the boundary layer is increased, and at the separation point S on the blade surface, the transverse vortex is discharged as a large-scale separation bubble, and the flow is separated on a large scale. The position of the separation point S is determined according to the shape of the blade 70, the main flow velocity, or the like.

When the above large-scale separation occurs, the airflow control device 12 is operated. An alternating voltage is applied between the first electrode 40 and the second electrode 41 by the discharge power supply 51 to generate plasma on the surface. Force that ions in the plasma receive from an electric field is transmitted to gas, and thereby a plasma induced flow occurs.

Note that it is preferable to cause the plasma induced flow to occur so as to flow in the flow direction of the airflow. When the plasma induced flow occurs, the low velocity portion of the boundary layer of the airflow is accelerated by the plasma induced flow to effectively affect velocity distribution.

For example, when pulse modulation control of intermittently controlling the application of voltage is performed in applying the alternating voltage, the plasma induced flow intermittently occurs corresponding to the above control. The state of the transverse vortex on the downstream side of the projecting portion 110 is in an unsteady state as described previously. For example, when a frequency at which the alternating voltage is applied, or a frequency fc of the pulse modulation control is tuned to the dominant frequency fs of the vortex flow discharged from the vortex shedding structure portion 20, the transverse vortices having been discharged from the projecting portion 110 resonate to have energy applied thereto, and thereby the transverse vortices are strengthened.

Then, the transverse vortices having been strengthened and discharged intermittently interfere with each other, and thereby longitudinal vortices occur, and by a longitudinal vortex structure of the longitudinal vortices, exchange of a momentum in the high velocity portion and a momentum of the low velocity portion in the boundary layer advances, and the low velocity portion of the boundary layer is prominently accelerated.

For this reason, as illustrated in FIG. 10, the large-scale separation is suppressed, and the airflow flows along the blade surface so as to attach to the blade surface. Accordingly, in the case of the blade, an effect of improvement of a lift or the like is obtained. Incidentally, even when the large-scale separation is not suppressed completely, the flow of the airflow is drawn to the blade side, and thereby pressure distribution is improved, and an effect of improvement of a lift, or the like is obtained.

Here, the frequency at which the above-described alternating voltage is applied, or the frequency fc of the pulse modulation control is set based on the dominant frequency fs of the discharge frequency of the vortex flow that is calculated from the relational expression of Expression (3) described previously. Incidentally, the frequency fc need not be equal to the dominant frequency fs completely, and as long as the frequency fc is a value in a range of ±10% of the dominant frequency fs, a sufficient effect of controlling the airflow is obtained. When the dominant frequency fs of the vortex flow and the frequency at which the alternating voltage is applied or the frequency fc of the pulse modulation control are not equal, the dominant frequency fs converges with the frequency fc.

In the airflow control device 12, the projecting portion 110 having the above-described shape is provided, and thereby even though the angle of attack of the blade changes, the flow is separated when the thickness of the boundary layer exceeds a certain value. For this reason, it is possible to discharge the vortex flow at the substantially fixed discharge frequency.

As described above, according to the airflow control device 12 in the third embodiment, by controlling the frequency at which the alternating voltage is applied, or the frequency fc of the pulse modulation control, the varying airflow can be controlled easily and accurately without providing a fluid variation sensor or the like. Further, the frequency at which the alternating voltage is applied, or the frequency fc of the pulse modulation control can be set based on the dominant frequency fs of the discharge frequency of the vortex flow. Further, the above dominant frequency fs can be determined by the geometric shape or the like of the vortex shedding structure portion 20. For this reason, the dominant frequency fs can be set easily without considering the degree of turbulence of the airflow, the state of an object surface on which the airflow flows, and the like.

According to the embodiments explained above, it becomes possible to control the varying airflow easily and accurately without providing a fluid variation sensor or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An airflow control device, comprising:
a vortex shedding structure portion discharging an airflow flowing on a surface in a flow direction as a vortex flow;
a downstream side structure portion disposed on a downstream side of the airflow from the vortex shedding structure and having a surface on which the airflow flows;
a first electrode disposed on the surface of the downstream side structure portion; and
a second electrode disposed in the downstream side structure portion and on a downstream side of the airflow from the first electrode,
wherein a voltage is applied between the first and second electrodes to generate a plasma induced flow having a flow direction parallel to the flow direction of the airflow for controlling flow of the airflow on the surface of the downstream side structure portion, and wherein the voltage is applied according to a pulse modulation frequency that causes a dominant frequency of the vortex flow discharged from the vortex shedding structure portion to converge with the pulse modulation frequency.

2. The airflow control device according to claim 1, wherein the vortex shedding structure portion is formed of a stepped portion formed at a boundary between an upstream side structure portion having the airflow flowing on a surface thereof and extended in the flow direction of the airflow and a the downstream side structure portion and is extended in the flow direction of the airflow, the surface of the downstream side structure portion is recessed in a stepped manner from the surface of the upstream side structure portion.

3. The airflow control device according to claim 2, wherein a boundary between the stepped portion and the upstream side structure portion is formed of an corner portion.

4. The airflow control device according to claim 2, wherein a boundary between the stepped portion and the upstream side structure portion is formed of a convex curved surface.

5. The airflow control device according to claim 1, wherein the vortex shedding structure portion is formed of a projecting portion projecting to have at least its upstream side formed of a curved surface in a direction perpendicular to the flow direction of the airflow from a surface of a structure portion having the airflow flow thereon.

6. The airflow control device according to claim 1, wherein a different voltage to be applied between the pair of first and second electrodes is an alternating voltage.

7. The airflow control device according to claim 6, wherein the voltage applied according to a pulse modulation frequency is applied between the first and second electrodes in a manner to increase/decrease or turn on/off the voltage intermittently at a cycle different from a cycle of the alternating voltage.

8. The airflow control device according to claim 6, wherein a frequency of the alternating voltage is equal to the dominant frequency.

9. The airflow control device according to claim 7, wherein the pulse modulation frequency is equal to the dominant frequency.

10. The airflow control device according to claim 1, wherein the vortex shedding structure portion includes a third and a fourth electrode disposed via a dielectric.

11. The airflow control device according to claim 10, wherein a voltage to be applied between the third and fourth electrodes in the vortex shedding structure portion is an alternating voltage.

12. The airflow control device according to claim 11, wherein a voltage is applied between the third and fourth electrodes in the vortex shedding structure portion in a manner to increase/decrease or turn on/off the voltage intermittently at a cycle different from a cycle of the alternating voltage between the third and fourth electrodes in the vortex shedding structure portion.

13. The airflow control device according to claim 10, wherein a frequency of an alternating voltage to be applied between the first and second electrodes disposed on a downstream side of the vortex shedding structure portion and a frequency of an alternating voltage to be applied between the third and fourth electrodes disposed in the vortex shedding structure portion are equal.

14. The airflow control device according to claim 12, wherein a frequency of a pulse modulation function that applies a voltage between the first and second electrodes disposed on a downstream side of the vortex shedding structure portion in a manner to increase/decrease or turn on/off the voltage intermittently and a frequency of a pulse modulation function that applies a voltage between the third and fourth electrodes disposed in the vortex shedding structure portion in a manner to increase/decrease or turn on/off the voltage intermittently are equal.

15. The airflow control device according to claim 13, wherein a phase difference is provided between the alternating voltage to be applied between the first and second electrodes disposed on the downstream side of the vortex shedding structure portion and the alternating voltage to be applied between the third and fourth electrodes disposed in the vortex shedding structure portion.

16. The airflow control device according to claim 14, wherein a phase difference is provided between the voltage to be applied between the first and second electrodes disposed on the downstream side of the vortex shedding structure portion in a manner to increase/decrease or turn on/off the voltage intermittently and the voltage to be applied between the third and fourth electrodes disposed in the vortex shedding structure portion in a manner to increase/decrease or turn on/off the voltage intermittently.

17. An airflow control method by using an airflow control device, the device comprising:

a vortex shedding structure portion to discharge an airflow flowing on a surface in a flow direction as a vortex flow;

a downstream side structure portion disposed on a downstream side of the airflow from the vortex shedding structure and having a surface on which the airflow flows;

a first electrode disposed on the surface of the downstream side structure portion; and a second electrode disposed in the downstream side structure portion and on a downstream side of the airflow from the first electrode, the method comprising:

discharging the airflow as the vortex flow at the vortex shedding structure portion; and applying a voltage between the first and second electrodes to generate a plasma induced flow having a flow direction parallel to the flow direction of the airflow for controlling flow of the airflow on the surface of the downstream side structure portion, wherein the voltage is applied according to a pulse modulation frequency that causes a dominant frequency of the vortex flow discharged from the vortex shedding structure portion to converge with the pulse modulation frequency.

* * * * *